(12) United States Patent
Yung et al.

(10) Patent No.: US 6,246,363 B1
(45) Date of Patent: *Jun. 12, 2001

(54) METHOD AND SYSTEM FOR INCORPORATING TWO-WAY RANGING NAVIGATION AS A CALIBRATION REFERENCE FOR GPS

(75) Inventors: Kar W. Yung, Torrance; David C. Cheng, Palos Verdes Estates; Donald C. D. Chang, Thousand Oaks, all of CA (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,062
(22) Filed: Dec. 10, 1998
(51) Int. Cl.[7] ............... H04B 7/185; G01S 5/02
(52) U.S. Cl. ............... 342/357.14; 342/357.02; 342/357.16; 701/214
(58) Field of Search ............... 342/357.16, 357.14, 342/357.09, 357.1, 357.02; 701/214, 220

(56) References Cited

U.S. PATENT DOCUMENTS

| 2,470,787 | 5/1949 | Nosker | 342/12 |
| 3,384,891 | 5/1968 | Anderson | 342/357 |
| 3,544,995 | 12/1970 | Bottenberg et al. | 342/46 |

(List continued on next page.)

FOREIGN PATENT DOCUMENTS

| 0 335 558 | 4/1989 | (EP) . |
| 2 271 902 | 10/1993 | (GB) . |
| 2 306 827 | 5/1997 | (GB) . |
| 2-28580 | 1/1990 | (JP) . |
| 3-291584 | 12/1991 | (JP) . |
| 07146995A | 6/1995 | (JP) . |
| 08015405 | 1/1996 | (JP) . |
| 09026328 | 1/1997 | (JP) . |
| 09113600 | 5/1997 | (JP) . |
| 10090391 | 4/1998 | (JP) . |

OTHER PUBLICATIONS

Teles J et al.: "Overview of TDRSS" Orbit Determination and Analysis. PSD Meeting, Copspar Technical Panel on Satelite Dynamics, 13th Cospar Scientific Assembly, Hamburg, Germany, Jul. 11–21, 1994, Advances in Space Research, pp. 67–76.

Bricker, P et al.: "Integrated Receiver for NASA Tracking and Data relay Satellite System", MILCOM 90. A new Era, 1990 IEEE Miltary Communications Conference, Monterey, CA, USA, Sep. 30 –Oct. 3, 1990, pp. 1–5.

(List continued on next page.)

Primary Examiner—Theodore M. Blum
(74) Attorney, Agent, or Firm—V. D. Duraiswamy; M. W. Sales (57) ABSTRACT

A method and system for using two-way ranging navigation to accurately determine the range along the path from source to destination by measuring the time delay during round-trip communication via satellite. The two-way ranging navigation measurements are used as calibration references, thereby improving the positioning accuracy of GPS. The system includes GPS and a two-way ranging navigation system for taking position measurements of a target. A correction factor is determined as a function of the measurements and the GPS position is adjusted by the correction factor. The method for calibrating GPS using two-way ranging navigation involves taking a two-way ranging navigation measurement and a GPS measurement of a target, determining a correction factor as a function of the measurements, and correcting the GPS position by taking a second GPS measurement and adjusting it by the correction factor.

15 Claims, 5 Drawing Sheets

U.S. PATENT DOCUMENTS

| | | | |
|---|---|---|---|
| 4,161,730 | 7/1979 | Anderson | 342/352 |
| 4,161,734 | 7/1979 | Anderson | 343/6.5 |
| 4,359,733 | 11/1982 | O'Neill | 342/6.5 |
| 4,613,864 | 9/1986 | Hofgen | 343/357 |
| 4,897,661 | 1/1990 | Hiraiwa | 342/457 |
| 4,994,809 | 2/1991 | Yung et al. | 342/108 |
| 5,006,855 | 4/1991 | Braff | 342/357 |
| 5,099,245 | 3/1992 | Sagey | 342/357 |
| 5,111,209 | 5/1992 | Toriyama | 342/357 |
| 5,126,748 | 6/1992 | Ames et al. | 342/353 |
| 5,387,916 | 2/1995 | Cohn | 342/44 |
| 5,410,314 | 4/1995 | Frush et al. | 342/26 |
| 5,444,450 | 8/1995 | Olds et al. | 342/357 |
| 5,525,995 | 6/1996 | Benner | 342/90 |
| 5,739,785 | 4/1998 | Allison et al. | 342/357 |
| 5,920,284 | 7/1999 | Victor | 342/357.01 |
| 5,944,770 * | 8/1999 | Enge et al. | 701/207 |
| 5,945,948 * | 8/1999 | Buford et al. | 342/457 |
| 5,969,674 * | 10/1999 | Von der Embse et al. | 342/357.16 |

OTHER PUBLICATIONS

Dunham, J B, et al.: "Onboard Orbit Estimation with Tracking and Data Relay Satellite System Data", Journal of Guidance, Control, and Dynamics, Jul.–Aug. 1983, USA, vol. 6 NR.4, pp.292–301.

K.H. Bethke, "A Novel Noncooperative Near–Range Radar Network or Traffic Guidance and Control Airport Surfaces", IEEE Transaction on Control Systems Technology, vol. 1, No. 3, Sep. 1993.

Doc 9524 FANS/4–WP/76, International Civil Aviation Organization, Special Committee on Future Air Navigation Systems, Fourth Meeting, Montreal, 2–20 May 1988, Report, pp. 3.2B–2 & 3.2B–3.

* cited by examiner (PRIOR ART)
FIG. 1

METHOD AND SYSTEM FOR INCORPORATING TWO-WAY RANGING NAVIGATION AS A CALIBRATION REFERENCE FOR GPS

CROSS-REFERENCE TO RELATED APPLICATIONS

This application is related to co-pending application Ser. No. 08/803,936 entitled "Method and System for Determining a Position of a Target Vehicle Utilizing Two-Way Ranging, filed Feb. 21, 1997, now U.S. Pat. No. 5,969,674 as well as co-pending application Ser. No. 08/803,937 entitled "Method and System for Determining a Position of a Transceiver Unit Utilizing Two-Way Ranging in a Polystatic Satellite Configuration filed Feb. 21, 1997. It is further related to co-pending application Ser. No. 09/174,182 entitled "Method and System for Determining a Position of a Communication Satellite Utilizing Two-Way Ranging, filed Oct. 16, 1998. The disclosures of each of pending applications Ser. Nos. 08/803,936 and 08/803,937 and 09/174,182 (PD97-0154 not yet filed)] are hereby incorporated by reference herein.

TECHNICAL FIELD

This invention relates to methods and systems for determining a position of a target vehicle. More particularly, this invention relates to a method and a system for calibrating the Global Positioning System using a two-way ranging navigation system.

BACKGROUND ART

Current Automatic Dependent Surveillance (ADS) technology in the form of a Global Positioning System (GPS) provides information utilizing satellite communication. The GPS, developed by the United States Department of Defense, consists of twenty-four (24) satellites that orbit the earth twice a day at an altitude of 12,000 miles. Additionally, the GPS consists of five (5) ground stations that monitor and manage the satellites. Using atomic clocks and location data, GPS satellites transmit continuous time and position information twenty-four (24) hours a day to a GPS receiver, which inputs data from three or more satellites simultaneously to determine the user's position on the earth. By measuring the time interval between the transmission and the reception of a satellite signal, the GPS receiver calculates the distance between the user and each satellite. The GPS receiver then uses the distance measurements from at least three satellites to arrive at a final user position or location.

The civilian GPS measurement yields an accuracy of approximately 100 meters. Additional accuracy, at a level needed for targets such as aircraft, is obtained by using a Differential GPS consisting of ground reference points. However, ground reference stations are expensive to deploy, and their effectiveness is limited to a finite radius from the reference position on the surface of the earth.

The civilian GPS system utilizes one-way ranging in which an accurate, synchronized clock is required at each station. Any synchronization error, or any error regarding the location of one of the satellites, results in an error in the determined position of the target. An aircraft, or other target, must have accurate position and velocity information and requires dedicated, precise equipment throughout the flight or mission to provide accurate position and velocity information with a high degree of integrity and reliability.

To overcome this problem, two-way ranging navigation has been proposed by co-pending U.S. application Ser. No. 08/803,936, which is incorporated herein by reference. The two-way ranging navigation system disclosed therein determines a position of a vehicle, such as an aircraft or surface vehicle, utilizing two-way ranging techniques through multiple satellites to derive independent estimates of a vehicle's state vectors including position and velocity.

The two-way ranging navigation system includes transmitting a first signal to a vehicle from a traffic control station through a plurality of satellites. From that signal, the vehicle acquires and tracks a unique ranging code, and a message signal containing the unique code is transmitted from the vehicle. The links through multiple satellites are sequentially or simultaneously processed to provide two-way ranging with reasonably accurate estimations of state vectors. The two-way ranging navigation system processes ranging measurements to derive estimations of vehicle state vectors in response to a first signal and a message signal at a traffic controller, preferably a ground-based traffic controller employing $\alpha$–$\beta$/EKF (Extended Kalman Factor) tracking.

Two-way ranging navigation can be used as a stand alone positioning system for a target with higher accuracy than GPS systems. During normal communication links, positioning with two-way ranging navigation consumes little space-segment resources. However, when there is no communication between the user and the satellite, also known as "silent intervals", two-way ranging navigation positioning requires additional space-segment bandwidth resources. GPS, on the other hand, being a one-way broadcast positioning system, requires no additional space-segment resources once it is deployed.

Therefore, there is a need to obtain the highest degree of positioning accuracy without the cost of two-way ranging navigation positioning and while utilizing the free civilian GPS signals whenever possible.

SUMMARY OF THE INVENTION

The present invention provides a method and system for using two-way ranging navigation to accurately determine the range along the path from a source to a destination by measuring the time delay during round-trip communication via satellite. The two-way ranging navigation measurements are used as calibration references, thereby improving the positioning accuracy of GPS without the cost of implementing Differential GPS and without the physical limitations associated with Differential GPS.

The system for calibrating GPS using two-way ranging navigation includes GPS and a two-way ranging navigation system for determining position measurements of a target. A correction factor is determined as a function of measurements taken by the two-way ranging navigation system and the GPS, and the GPS position of the target is adjusted by the correction factor.

The method for calibrating GPS using two-way ranging navigation includes taking a two-way ranging navigation measurement of a target, such as an aircraft, at a first predetermined time. A first GPS measurement of the target is also taken at the first predetermined time. A correction factor is determined as a function of the two-way ranging measurement and the GPS measurement. The GPS position is corrected by taking a second GPS measurement of the target at a second predetermined time and adjusting the measurement by the correction factor to obtain a corrected GPS position.

This method is especially advantageous for aircraft where higher positioning accuracy can be extended to all phases of flight without having to perform frequent two-way ranging navigation measurements. Higher accuracy can be obtained, when desired, by performing more two-way ranging navigation measurements whenever, and wherever, needed. In the application of aircraft, higher positioning accuracy in mid-course and landing can help reduce the size of safety buffer zones between aircraft, thereby increasing throughput capacity and air traffic efficiency.

It is an object of the present invention to improve the accuracy of GPS without adding unwanted cost and complexity. It is another object of the present invention to utilize two-way ranging navigation as a calibration reference for GPS. It is yet another object of the present invention to broadcast calibration information to all users within a predetermined region.

It is a further object of the present invention to maintain flexibility in the calibration method so as to allow different levels of accuracy based on different applications for navigation. It is still a further object of the present invention to provide a back up navigation system for GPS in the case of GPS failure.

The above objects and other objects, features and advantages of the present invention are readily apparent from the following detailed description of the preferred embodiment when taken in conjunction with the accompanying drawings and appended claims.

BEST MODES FOR CARRYING OUT THE INVENTION

Figure 1:
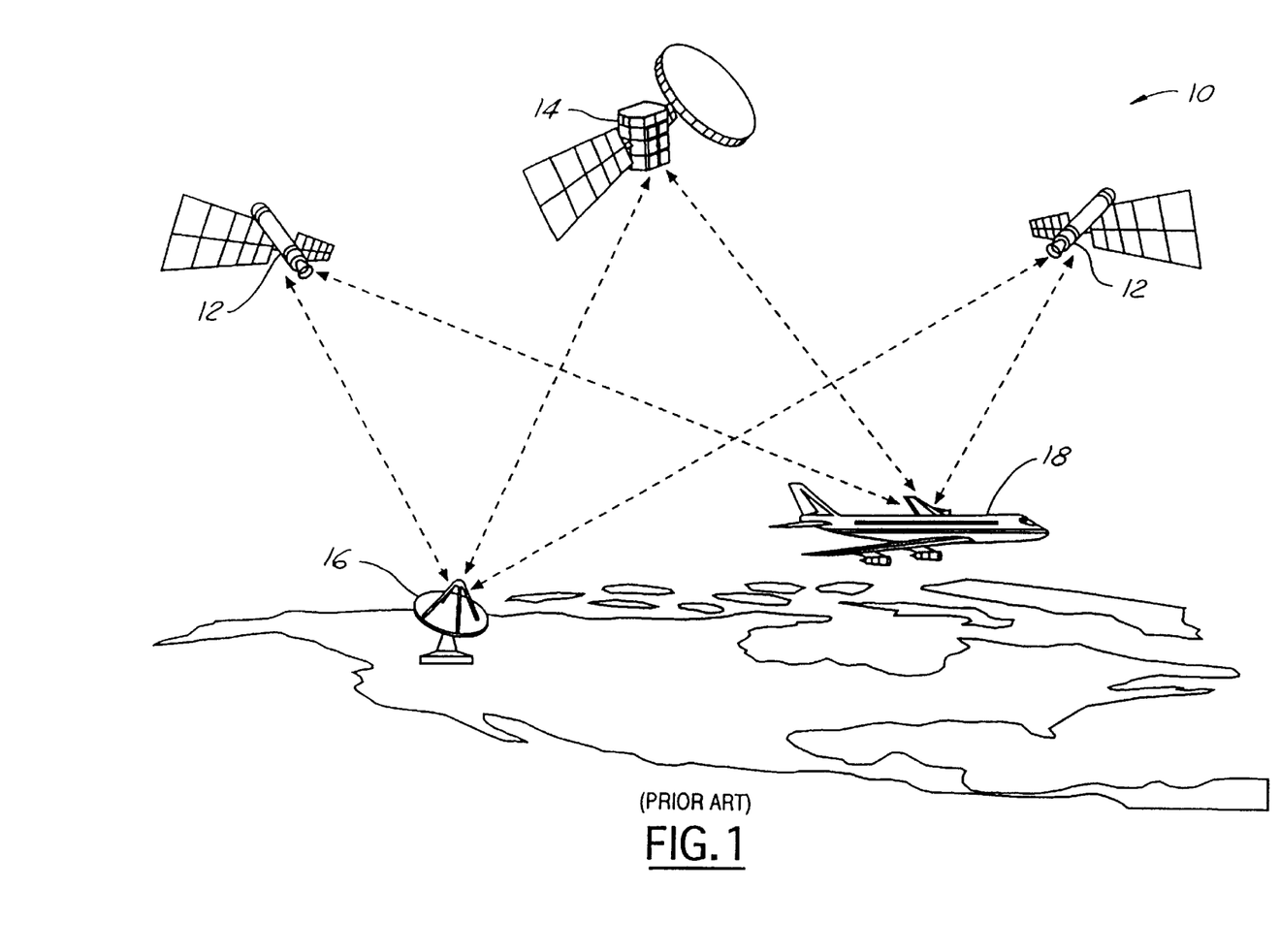
FIG. 1 is a diagrammatic representation illustrating a known communication system employing two-way ranging navigation as a constellation of two Medium Earth Orbit (MEO) satellites and one Geosynchronous Earth Orbit (GEO) satellite.

Referring to FIG. 1, an implementation of a known two-way ranging navigation system for position location and tracking of objects, such as people, vehicles, and aircraft from one or more ground stations via two-way satellite communication links used in the system and method of the present invention, is shown. An overview of two-way ranging navigation will be discussed below. For a detailed discussion of the operation of two-way ranging navigation, U.S. patent application Ser. No. 08/803,936 is incorporated herein by reference.

Two-way ranging navigation tracks objects through triangulation, trilateration, and Doppler techniques which involve multiple satellites in multiple orbital planes in Low Earth Orbit (LEO), Medium Earth Orbit (MEO), and Geosynchronous Earth Orbit (GEO) constellations. FIG. 1 illustrates a two-way ranging navigation system 10 using a plurality of satellites, and in particular, two MEO satellites 12 and a GEO satellite 14. It should be noted that any combination of a plurality of LEO, MEO and GEO satellites can be used to achieve results similar to those of the system depicted in FIG. 1.

In operation, a ground station 16, such as a Satellite Access Node (SAN), preferably with traffic control monitoring, processing and signaling, transmits a ranging signal to a target 18, such as an aircraft, via any one of the MEO or GEO satellites 12. The target 18 acquires and tracks a unique ranging code from a satellite, which is then retransmitted, along with a data message, to the same satellite from which the target 18 received the code, and then down to the ground station 16.

There are multiple links available, for example, through a plurality of different satellites most of the time, but at least two satellites are always within the field of view of the target 18. A set of the satellites within the field of view may be employed simultaneously through two satellites, or sequentially through a single satellite without departing from the scope and spirit of the present invention.

The forward and return path of the ranging signals can be routed through different satellites creating a polystatic trilateration scheme such as described in co-pending U.S. patent application Ser. No. 08/803,937 which is also incorporated herein by reference. A polystatic configuration consists of several transceivers at separated locations, which cooperate with each other. The transceivers may be stationary or moving. By utilizing polystatic techniques, in which the forward and return ranging signals propagate through different satellites, the equal range locations of measurement are confined to an ellipsoidal surface. The two foci are located in the satellite positions so that the sum of the distances between the target 18 and the satellites 12 and 14 are a constant. The two-way ranging navigation measurements are used to derive an α–β Extended Kalman Filter (EKF) to estimate the target's 18 state vectors at the ground station 16. A polystatic configuration provides a more accurate and a more flexible communication system.

Figure 2:
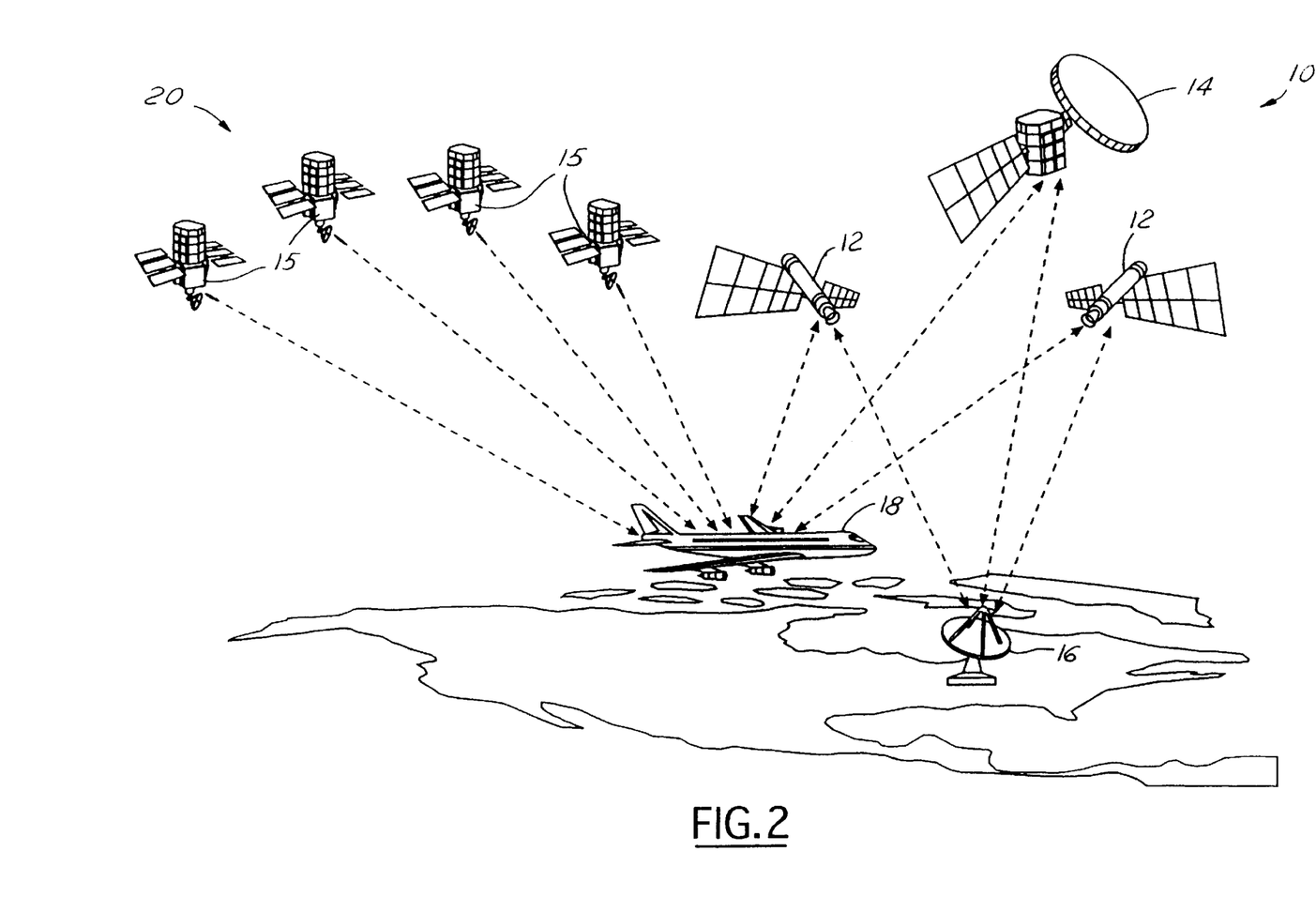
FIG. 2 is a diagrammatic representation illustrating GPS in conjunction with a two-way ranging navigation configuration.
Figure 3:
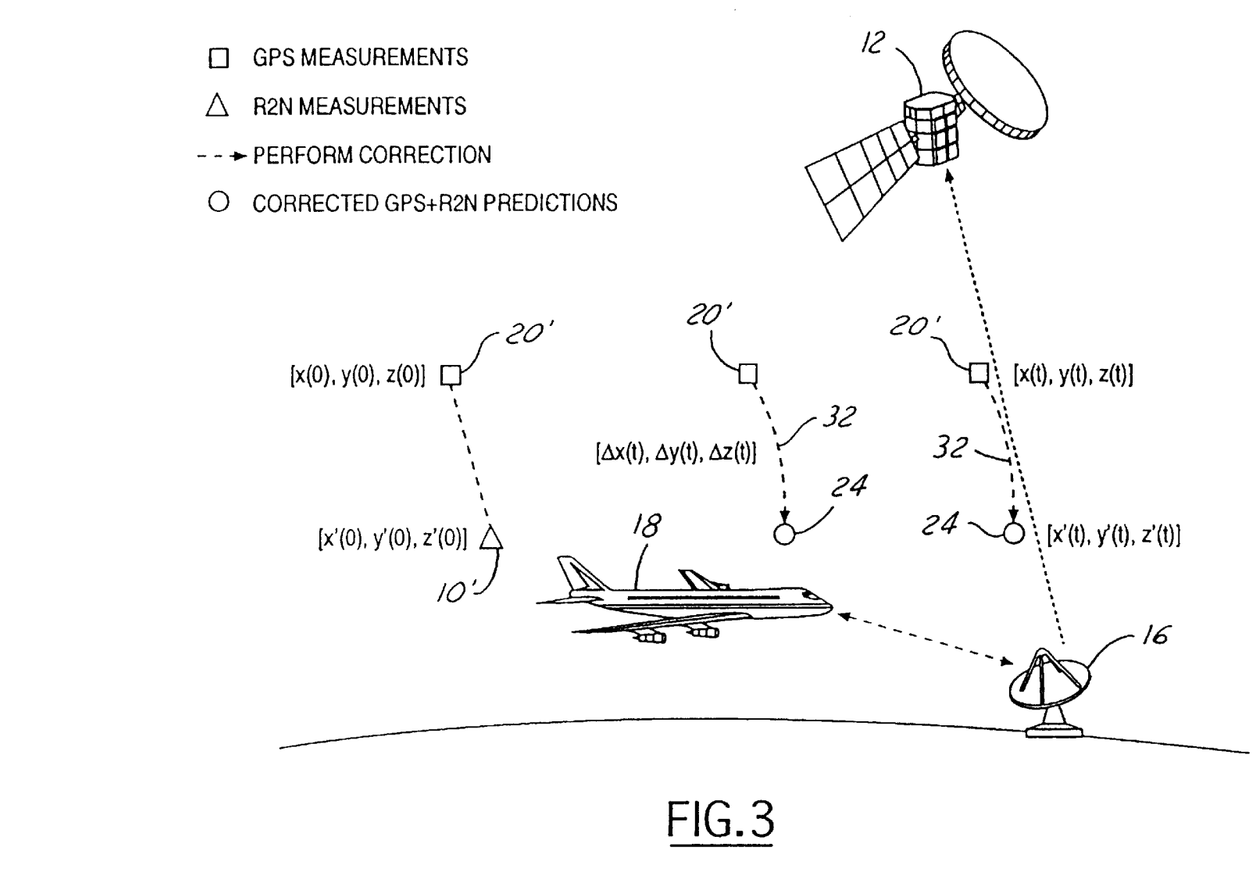
FIG. 3 is a diagrammatic representation of GPS with two-way ranging navigation calibration references.

Referring now to FIGS. 2 and 3, a GPS system 20 in conjunction with the two-way ranging navigation system 10 described above, is shown. In FIG. 2, additional satellites 15 are shown in the system, together with satellites 12 and 14. The present invention utilizes the highly accurate measurements of the two-way ranging navigation system 10 as calibration references to cancel out errors that exist in GPS measurements.

In particular, the method of the present invention requires taking a two-way ranging navigation measurement, R2N 10' from the two-way ranging navigation system 10, and a GPS measurement 20' from the GPS system 20 of the target 18 at a first predetermined period of time, i.e. t=0. Referring to FIG. 3, at time t=0, the measurements are:

$$\text{GPS}(t)|_{t=0}:\text{GPS}(0)=\{x(0), y(0), z(0)\} \quad (1)$$

$$\text{R2N}(t)|_{t=0}:\text{R2N}(0)=\{x'(0), y'(0), z'(0)\} \quad (2)$$

Figure 4:
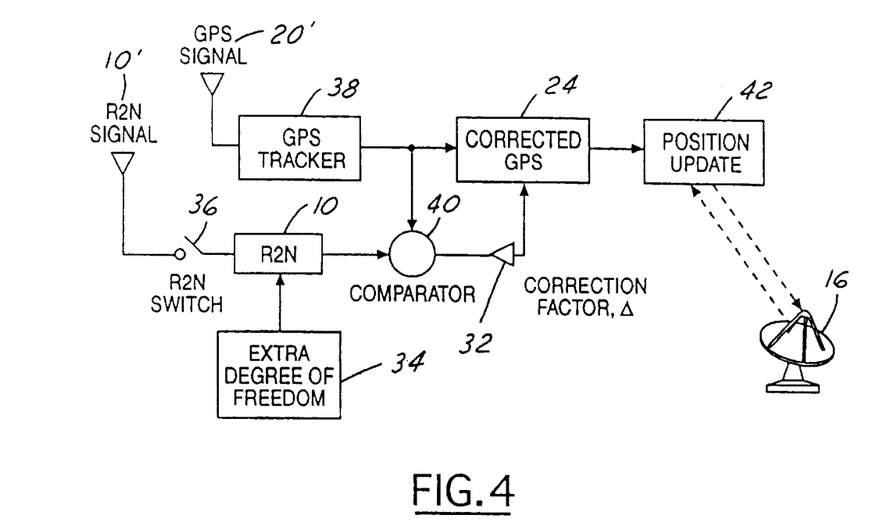
FIG. 4 is a block diagram of an embodiment of the method of calibration of the present invention.

The concept shown diagrammatically in FIG. 3 is shown in block form in FIG. 4. The correction factor 32, Δ, is calculated as a function of GPS(0) and R2N(0):

$$\Delta(t)|_{t=0}:\Delta(0)=f[\text{R2N}(0), \text{GPS}(0)]=\text{R2N}(0)-\text{GPS}(0) \quad (3)$$

The correction factor 32, Δ(t), at any time, can be extracted from Δ(0) and other available information such as satellite positions, data from an on-board inertial navigation system such as a conventional mechanical gyro system that monitors the distance traveled by the target 18 from a predetermined position, and the results of EKF. Applying the mathematical concept of an extra degree of freedom 34 allows two-way ranging and navigation to calibrate unknown parameters by manipulating excessive data. The concept of the extra degree of freedom 34 provides capability to solve for additional unknown parameters, thereby making the position estimation more accurate in comparison to equations with less parameters.

R2N switch 36 allows communication only when necessary and required, and prevents communication when not necessary. The communication line can be visualized as a switch that is closed to allow communication and open to prevent communication.

The correction factor 32 is applied to the GPS position at a second predetermined time, t, and the corrected GPS position 24, GPS*, has the form:

$$GPS^*(t) = GPS(t) + \Delta(t)$$

where $$\Delta(t) = f(t, \Delta(0), GPS(t), \ldots) \quad (4)$$

As shown in FIG. 4, the GPS signal 20' is received by a GPS tracker 38, and transmitted to a comparator 40. The two-way ranging navigation signal 10' is received by the two-way ranging navigation system 10, and is also sent to comparator 40, where the signals 20' and 10' are used to determine the correction factor 32. The correction factor 32, is then applied to the GPS signal taken at a second predetermined point in time, and results in a corrected GPS signal 24 that is used to update the position 42 of the target 18 at the ground station 16, which in the case of an aircraft target is an Air Traffic Control station.

Figure 5:
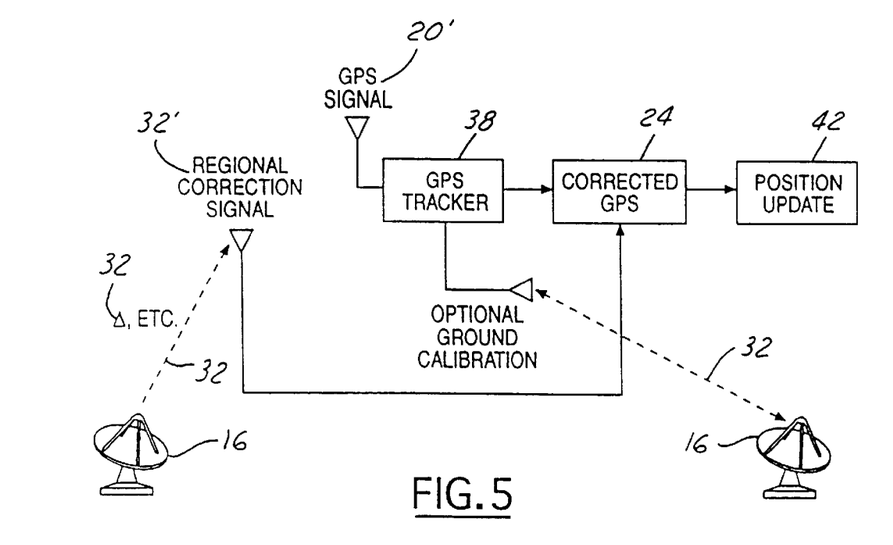
FIG. 5 is a block diagram of an embodiment of the method of calibration of the present invention in which the correction factor is broadcast to users.

FIG. 5 demonstrates the correction factor 32 being broadcast to all users within a region as a regional correction signal 32'. After the correction factor 32 is estimated as shown in FIG. 4 and described above, a user transmits the correction factor 32 to the ground station 16 in any manner, for example, by two-way satellite communication links. The ground station 16 is then able to broadcast the correction factor 32 to all users within a predetermined region, who are capable of utilizing the regional correction factor 32' to obtain a corrected GPS position 24 and ultimately update the position 42 of the target 18.

It is apparent to one skilled in the art that the system and method of the present invention dramatically improves the resolution and accuracy of conventional GPS measurements while at the same time reduces the need for users to perform frequent two-way ranging navigation calibration. Only one set of calibrations is needed per region, thereby increasing the accuracy of GPS and at the same time keeping communication costs low as a result of infrequent two-way ranging measurements.

It is also readily apparent that aside from the increase in resolution and accuracy, the present invention has the advantage of flexibility in processing measurements and data. Measurements and other data can be relayed between the user and the ground station 16 via two-way communication links. Data processing can be performed either on-board the target 18, or at the ground station 16.

Additionally, and similarly to Differential GPS, the system and method of the present invention allows the correction factor, 32, $\Delta$, which is preferably calculated at the ground station 16 for most accuracy, but which can also be calculated onboard, to be translated into GPS range corrections, $(\Delta r_1, \Delta r_2, \ldots)$ that can then be broadcast to all GPS users within a region. In this embodiment, the correction process becomes:

$$\text{Raw GPS position: GPS}(t) = f(r_1, r_2, \ldots) \quad (5)$$

$$\text{Corrected GPS position: GPS}^*(t) = f(r_1 + \Delta r_1, r_2 + \Delta r_2, \ldots) \quad (6)$$

Where $r_1, r_2, \ldots$ are ranges corresponding to the ranges between the positions in space of communication satellites 12, 14 and 15 and the ground station 16.

Two-way ranging navigation measurements are highly accurate. Therefore, by correcting the GPS with a well known and accurate reference point in the form of a two-way ranging navigation measurement, errors from selective availability, ionosphere, and atmosphere can be dramatically reduced. However, since atmospheric delay can vary due to weather dynamics, two-way ranging navigation calibration measurements should be performed whenever there is a significant change in weather conditions.

Like Differential GPS, the present invention provides enhanced positioning measurement that utilizes a very accurate reference point to correct error. However, unlike Differential GPS, the present invention does not need to establish a reference point in advance. The present invention is capable of generating a two-way ranging navigation reference point whenever and wherever it is deemed appropriate or necessary. Also, the accuracy of the system and method of the present invention is flexible and can be controlled, allowing a user to select the level of accuracy needed for their particular purpose, eliminating overkill for applications that do not require a high degree of accuracy, resulting in lower operating costs.

When there is a need for higher accuracy, for example in navigation during conditions of zero visibility, the frequency of two-way ranging navigation measurements is increased. This increases the accuracy of GPS through more frequent correction factor calculations and adjustments. This flexibility enables the present invention to be used in a variety of applications including, but not limited to, commercial aviation, ships, shipment containers, surface vehicles, and mobile handsets.

Figure 6:
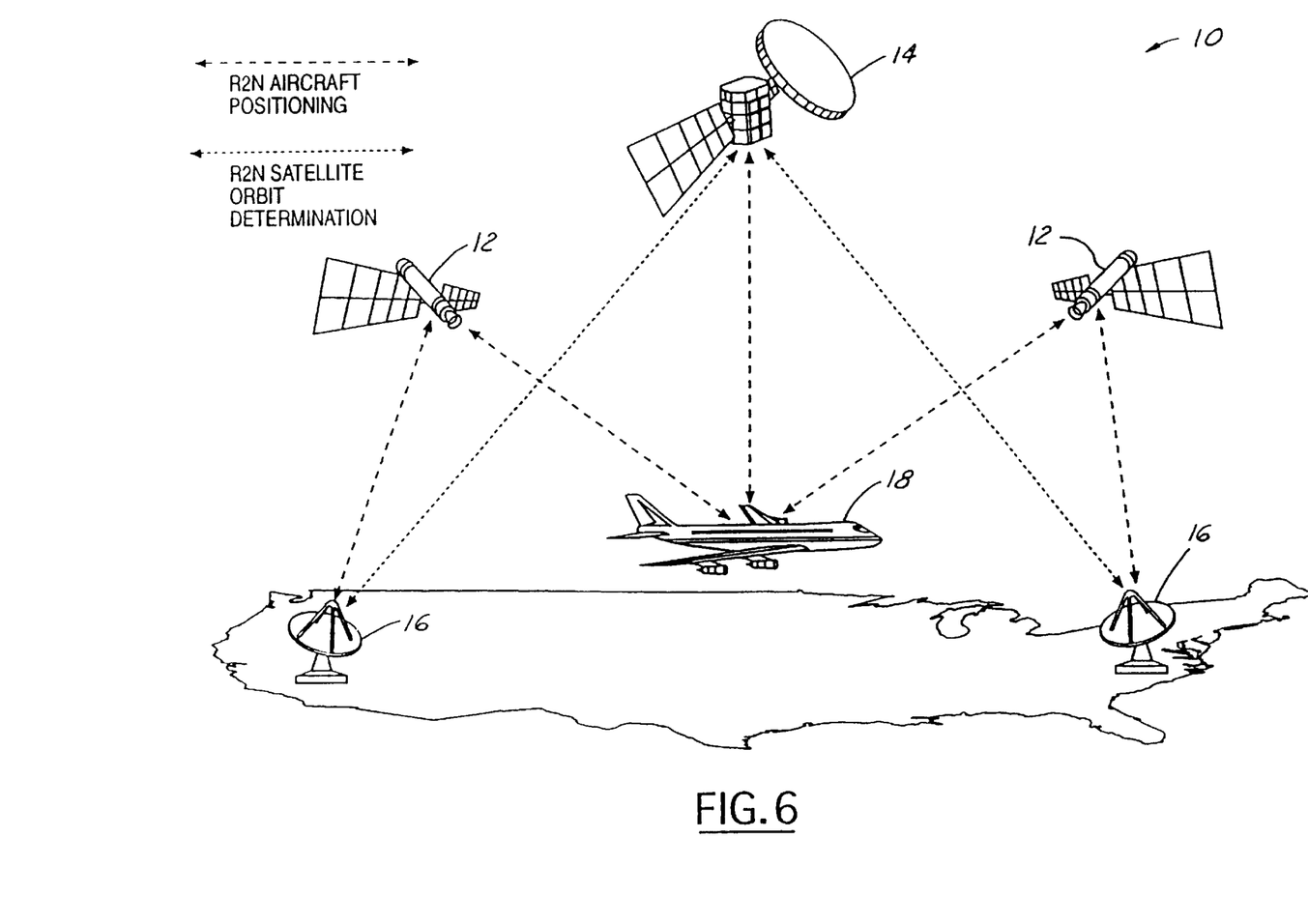
FIG. 6 is a diagrammatic representation of two-way ranging navigation as a backup navigation system to GPS.

By incorporating GPS with two-way ranging navigation, a back-up navigation method for GPS is established. Therefore, in cases of GPS signal jamming, two-way ranging navigation is able to provide complete navigation without GPS. The two-way ranging navigation satellites 12 and 14 can establish two-way ranging navigation calibration references whenever and wherever a user chooses, provided there was a previous R2N calibration within a certain duration or time, thereby achieving high positioning accuracy without the assistance of GPS. This is described in detail in co-pending U.S. patent application Ser. No. 08/803, 936, which has been incorporated herein by reference.

The present invention has application in many multiple-satellite constellations or combinations of multiple constellations. The present invention enhances the accuracy of conventional GPS and provides a simple method for more flexible accuracy in tracking a target. Even if the GPS malfunctions, the present invention provides accurate navigation measurements for a variety of tracking applications.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A method for calibrating a global positioning system using a two-way ranging navigation system, said method comprising the steps of:
   taking a two-way ranging navigation measurement of a target at a first predetermined time;
   taking a first global positioning system measurement of said target at said first predetermined time;
   determining a correction factor as a function of said two-way ranging navigation measurement and said global positioning system measurement; and
   obtaining a corrected global positioning measurement by taking a second global positioning system measurement of said target at a second predetermined time and adjusting said second global positioning system measurement by said correction factor.

2. The method of claim 1 wherein said step of determining a correction factor further comprises determining said correction factor as function of said two-way ranging navigation measurement and said global positioning system measurement at said first predetermined time and a known satellite position.

3. The method of claim 1 wherein said step of determining a correction factor further comprises determining said correction factor as a function of said two-way ranging navigation measurement at said first predetermined time and data from an inertial navigation system located on-board said target.

4. The method of claim 1 wherein said step of determining a correction factor further comprises determining said correction factor as a function of said two-way ranging navigation measurement, said global positioning system measurement at said first predetermined time and results of Extended Kalman Filtering.

5. The method of claim 1 wherein said step of correcting the global positioning system position further comprises relaying data and measurements by way of two-way communication links.

6. The method of claim 1 wherein said step of determining a correction factor further comprises performing data processing on-board said target.

7. The method of claim 1 wherein said step of determining a correction factor further comprises performing data processing at a ground station.

8. The method of claim 1 wherein said step of determining a correction factor further comprises translating said correction factor into GPS range correction factors.

9. The method of claim 1 further comprising the step of repeating the calibration method steps when weather conditions change.

10. The method of claim 1 further comprising the step of enhancing the accuracy of said calibrating method by increasing the frequency of two-way ranging and navigation measurements.

11. The method of claim 1 further comprising the steps of:
    sending said correction factor to a ground station; and
    broadcasting said correction factor throughout a predetermined region.

12. The method of claim 1 wherein said two-way ranging navigation system is a back-up navigation method for said global positioning system in instances of failure of said global positioning system.

13. A system for calibrating a global positioning system, said system comprising:
    a two-way ranging navigation system;
    a global positioning system;
    means for determining a correction factor as a function of measurements taken by said two-way ranging navigation system and said global positioning system; and
    means for adjusting a position of said global positioning system by said correction factor.

14. The system of claim 13 wherein said correction factor further comprises a range of correction factors in other forms.

15. A method for calibrating a global positioning system comprising the steps of:
    a) taking a first global positioning system measurement of a target at a first predetermined period of time;
    b) taking a two way ranging navigation measurement of a target at said first predetermined period of time, said two way ranging navigation system comprising:
       i) at least one ground station;
       ii) a plurality of satellites in communication with said ground station through a first link; and
       iii) a target in communication with said satellites through a second link, said first and second links defining a path for carrying transmissions including a unique coded signal wherein each said path is a two way communication network between one of said plurality of satellites, said ground station and said target, said communication network includes ranging determination for said target with respect to at least two of said paths including a transmission with said unique coded signal portion;
    c) determining a correction factor as a function of said two-way ranging navigation measurement and said global positioning system measurement; and
    d) obtaining a corrected global positioning system measurement by taking a second global positioning system measurement of said target at a second predetermined time and adjusting said second global positioning system measurement by said correction factor.

* * * * *